United States Patent
Hudson et al.

(10) Patent No.: US 11,314,626 B2
(45) Date of Patent: Apr. 26, 2022

(54) METHOD AND SYSTEM FOR MANAGING CONTINUOUS DELIVERY PIPELINE TESTING AGAINST SINGLETON INSTANCE OF APPLICATIONS

(71) Applicant: HCL America, Inc., Sunnyvale, CA (US)

(72) Inventors: Michael Hudson, Delray Beach, FL (US); Bahram Sanaei, Raleigh, NC (US); Asiyah Ahmad, Garner, NC (US)

(73) Assignee: HCL America Inc., Sunnyvale, CA (US)

( * ) Notice: Subject to any disclaimer, the term of this patent is extended or adjusted under 35 U.S.C. 154(b) by 63 days.

(21) Appl. No.: 16/907,186

(22) Filed: Jun. 20, 2020

(65) Prior Publication Data

US 2021/0397537 A1 Dec. 23, 2021

(51) Int. Cl.
| | |
|---|---|
| *G06F 11/36* | (2006.01) |
| *G06F 8/77* | (2018.01) |
| *G06F 8/60* | (2018.01) |
| *G06F 8/33* | (2018.01) |
| *G06F 8/34* | (2018.01) |
| *G06F 8/36* | (2018.01) |

(52) U.S. Cl.
CPC ........ *G06F 11/368* (2013.01); *G06F 11/3684* (2013.01); *G06F 11/3688* (2013.01); *G06F 8/33* (2013.01); *G06F 8/34* (2013.01); *G06F 8/36* (2013.01); *G06F 8/60* (2013.01); *G06F 8/77* (2013.01)

(58) Field of Classification Search
CPC . G06F 11/368; G06F 11/3684; G06F 11/3688
See application file for complete search history.

(56) References Cited

U.S. PATENT DOCUMENTS

| | | | | |
|---|---|---|---|---|
| 2006/0212857 A1* | 9/2006 | Neumann | ................. | G06F 8/20 717/140 |
| 2017/0003948 A1* | 1/2017 | Iyer | .......................... | G06F 8/60 |
| 2019/0294531 A1* | 9/2019 | Avisror | ..................... | G06F 8/60 |
| 2020/0250078 A1* | 8/2020 | Jagannath | .............. | G06N 20/00 |

* cited by examiner

*Primary Examiner* — Hanh Thi-Minh Bui
(74) *Attorney, Agent, or Firm* — Kendal Sheets

(57) ABSTRACT

A method and system for coordinating continuous delivery pipeline testing against a singleton instance of an application is disclosed. The method may include identifying a set of unchanged components across a preceding build and a current build of the singleton instance, and identifying a first set of test cases from a plurality of test cases executed on at least one unchanged component. The method may further include performing execution of a second set of test cases on the remaining set of unchanged components in the current build, and performing execution of each of the plurality of test cases on at least one changed component in the current build. The method may further include reporting test results of executing the first set of test cases on the at least one unchanged component, the second set of test cases, and the plurality of test cases.

10 Claims, 6 Drawing Sheets

METHOD AND SYSTEM FOR MANAGING CONTINUOUS DELIVERY PIPELINE TESTING AGAINST SINGLETON INSTANCE OF APPLICATIONS

TECHNICAL FIELD

This disclosure relates generally to software testing, and more particularly to a method and system for coordinating continuous delivery pipeline testing against a singleton instance of an application.

BACKGROUND

Automation testing is a software testing technique to test and compare the actual outcome with the expected outcome. Automation testing has assumed an important role in the software development for its numerous benefits like faster feedback, and reduced manual effort.

As it will be appreciated by those skilled in the art, continuous delivery is a frequent and automated deployment of new application versions into a production environment. It may be important to run instances of a new application version until the next deployment. In some cases, it may be possible to run only a singleton instance. This provides opportunity for continuous test running until the next delivery. Further, in some testing scenarios, two or more builds may be running concurrently, one ahead of the other. In such scenarios, each build may have to share a singleton instance of the application that it may start, stop and test. However, it is a challenge to handle test scenarios when a preceding build (for example, a build "N") is testing but a current build (for example, a build "N+M") is rebuilding and redeploying the singleton instance.

SUMMARY

In one embodiment, a method for coordinating continuous delivery pipeline testing against a singleton instance of an application is disclosed. The method may include identifying a set of unchanged components across a preceding build and a current build of the singleton instance. The preceding build may precede the current build. The method may further include identifying a first set of test cases from a plurality of test cases executed on at least one unchanged component from the set of unchanged components in the preceding build. The method may further include performing execution of a second set of test cases from the plurality of test cases on the remaining set of unchanged components in the current build, and performing execution of each of the plurality of test cases on at least one changed component in the current build. The at least one changed component is uncommon across the preceding build and the current build. The method may further include reporting test results of executing the first set of test cases on the at least one unchanged component in the preceding build, reporting test results of executing the second set of test cases on the remaining set of unchanged components in the current build, and reporting test results of executing the plurality of test cases on the at least one changed component in the current build.

In another embodiment, a testing device for coordinating continuous delivery pipeline testing against a singleton instance of an application is disclosed. The testing device may include a processor and a memory communicatively coupled to the processor. The memory stores processor instructions, which, on execution, may cause the processor to identify a set of unchanged components across a preceding build and a current build of the singleton instance, wherein the preceding build precedes the current build, and identify a first set of test cases from a plurality of test cases executed on at least one unchanged component from the set of unchanged components in the preceding build. The processor instructions, on execution, may further cause the processor to perform execution of a second set of test cases from the plurality of test cases on the remaining set of unchanged components in the current build, and perform execution of each of the plurality of test cases on at least one changed component in the current build. The at least one changed component is uncommon across the preceding build and the current build. The processor instructions, on execution, may further cause the processor to report test results of executing the first set of test cases on the at least one unchanged component in the preceding build, report test results of executing the second set of test cases on the remaining set of unchanged components in the current build, and report test results of executing the plurality of test cases on the at least one changed component in the current build.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
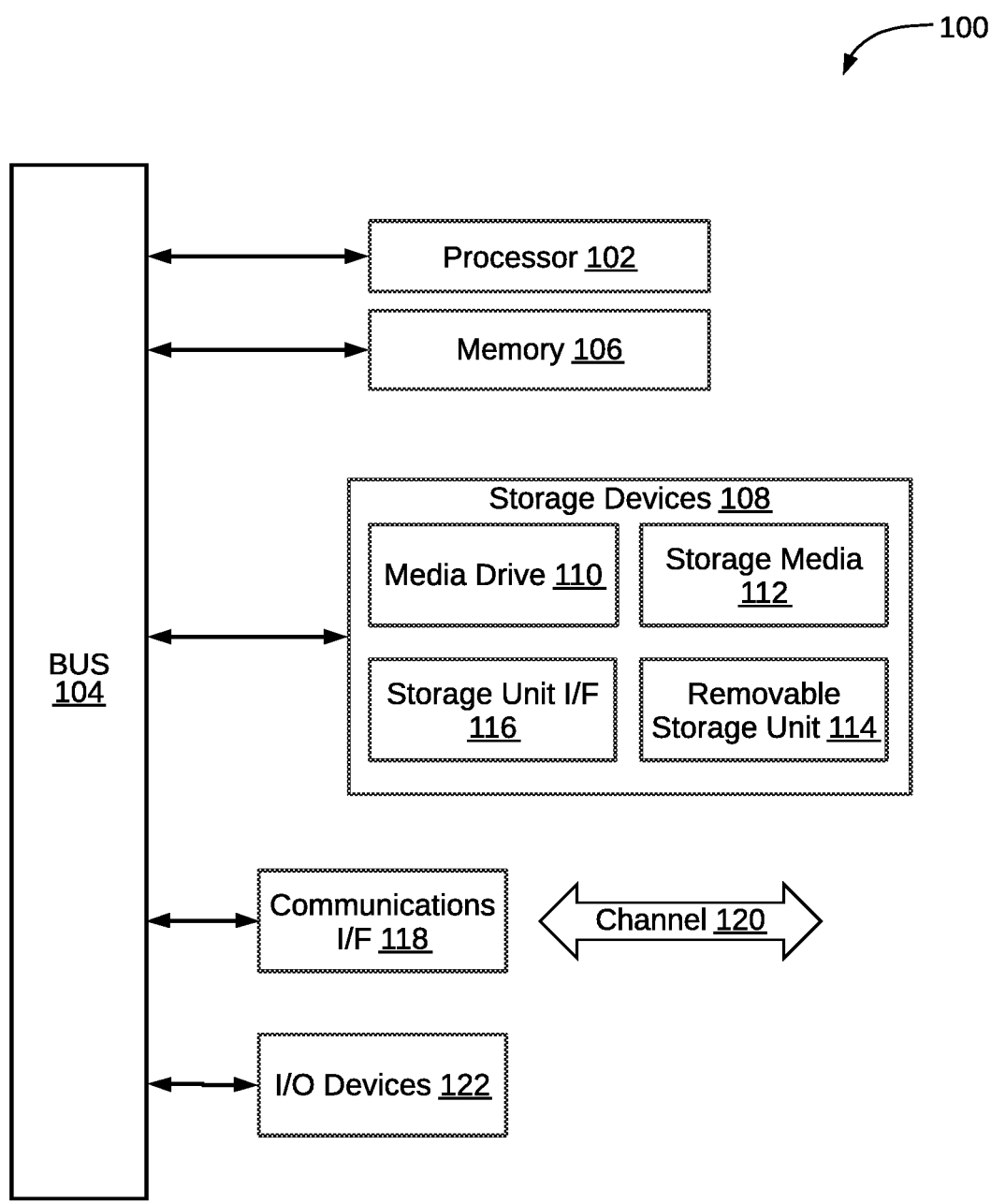
FIG. 1 is a block diagram of a computing system that may be employed to implement processing functionality for various embodiments.

Referring now to FIG. 1, an exemplary computing system 100 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 100 may represent, for example, a user device such as a desktop, a laptop, a mobile phone, personal entertainment device, DVR, and so on, or any other type of special or general-purpose computing device as may be desirable or appropriate for a given application or environment. The computing system 100 may include one or more processors, such as a processor 102 that may be implemented using a general or special purpose processing engine such as, for example, a microprocessor, microcontroller or other control logic. In this example, the processor 102 is connected to a bus 104 or other communication medium.

The computing system 100 may also include a memory 106 (main memory), for example, Random Access Memory (RAM) or other dynamic memory, for storing information and instructions to be executed by the processor 102. The memory 106 also may be used for storing temporary variables or other intermediate information during execution of instructions to be executed by the processor 102. The computing system 100 may likewise include a read only memory ("ROM") or other static storage device coupled to bus 104 for storing static information and instructions for the processor 102.

The computing system 100 may also include a storage devices 108, which may include, for example, a media drive 110 and a removable storage interface. The media drive 110 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 112 may include, for example, a hard disk, magnetic tape, flash drive, or other fixed or removable medium that is read by and written to by the media drive 110. As these examples illustrate, the storage media 112 may include a computer-readable storage medium having stored therein particular computer software or data.

In alternative embodiments, the storage devices 108 may include other similar instrumentalities for allowing computer programs or other instructions or data to be loaded into the computing system 100. Such instrumentalities may include, for example, a removable storage unit 114 and a storage unit interface 116, such as a program cartridge and cartridge interface, a removable memory (for example, a flash memory or other removable memory module) and memory slot, and other removable storage units and interfaces that allow software and data to be transferred from the removable storage unit 114 to the computing system 100.

The computing system 100 may also include a communications interface 118. The communications interface 118 may be used to allow software and data to be transferred between the computing system 100 and external devices. Examples of the communications interface 118 may include a network interface (such as an Ethernet or other NIC card), a communications port (such as for example, a USB port, a micro USB port), Near field Communication (NFC), etc. Software and data transferred via the communications interface 118 are in the form of signals which may be electronic, electromagnetic, optical, or other signals capable of being received by the communications interface 118. These signals are provided to the communications interface 118 via a channel 120. The channel 120 may carry signals and may be implemented using a wireless medium, wire or cable, fiber optics, or other communications medium. Some examples of the channel 120 may include a phone line, a cellular phone link, an RF link, a Bluetooth link, a network interface, a local or wide area network, and other communications channels.

The computing system 100 may further include Input/Output (I/O) devices 122. Examples may include, but are not limited to a display, keypad, microphone, audio speakers, vibrating motor, LED lights, etc. The I/O devices 122 may receive input from a user and also display an output of the computation performed by the processor 102. In this document, the terms "computer program product" and "computer-readable medium" may be used generally to refer to media such as, for example, the memory 106, the storage devices 108, the removable storage unit 114, or signal(s) on the channel 120. These and other forms of computer-readable media may be involved in providing one or more sequences of one or more instructions to the processor 102 for execution. Such instructions, generally referred to as "computer program code" (which may be grouped in the form of computer programs or other groupings), when executed, enable the computing system 100 to perform features or functions of embodiments of the present invention.

In an embodiment where the elements are implemented using software, the software may be stored in a computer-readable medium and loaded into the computing system 100 using, for example, the removable storage unit 114, the media drive 110 or the communications interface 118. The control logic (in this example, software instructions or computer program code), when executed by the processor 102, causes the processor 102 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Figure 2:
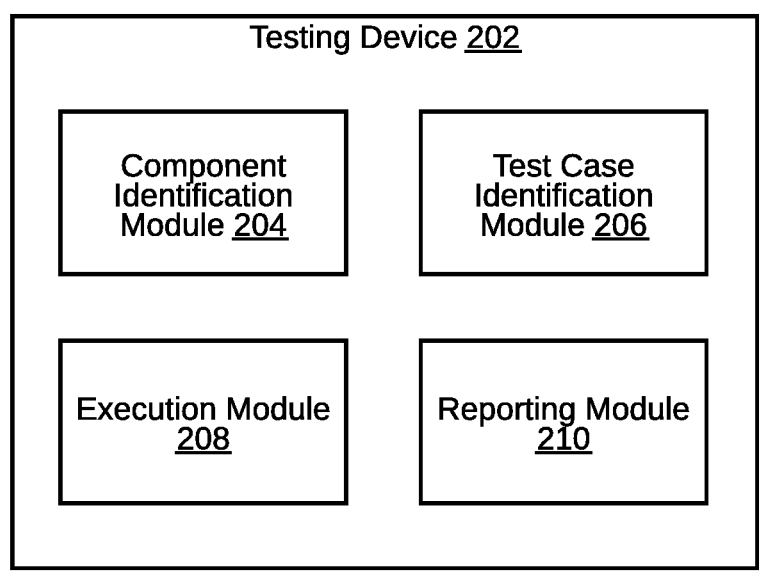
FIG. 2 is a functional block diagram of a testing device for coordinating continuous delivery pipeline testing against a singleton instance of an application, in accordance with an embodiment.

Referring now to FIG. 2, a functional block diagram of a testing device 202 for coordinating continuous delivery pipeline testing against a singleton instance of an application is illustrated, in accordance with an embodiment. In some embodiment, the system 100 may be implemented for scenarios when two or more builds may be running concurrently, one ahead of the other, such that each build has an instance of the singleton application. For example, in one such scenario, a preceding build (for example, a build "N") may be testing and a current build (for example, a build "N+M") is rebuilding and redeploying the singleton instance.

The testing device 202 may be employed within the system 100. By way of an example, the testing device 202 may be a test server. In some embodiments, the testing device 202 may determine whether testing is being executed on a preceding build or a current build of a singleton instance of an application. In case the testing is being executed on the preceding build, the testing device 202 may stop execution of the testing on the preceding build, in response to determining the same. Further, the testing device 202 may report an aborted status for execution of testing on the preceding build, in response to the stopping. The testing device 202 may further stop the preceding build of the singleton instance, and deploy a current build of the singleton instance. The testing device 202 may further start the current build of the singleton instance in response to stopping the preceding build.

In some embodiments, the testing device 202 may include a component identification module 204, a test case identification module 206, an execution module 208, and reporting module 210. The component identification module 204 may identify a set of unchanged components across the preceding build and the current build of the singleton instance. It may be noted that the preceding build may precede the current build. Further, it may be understood that each build of the singleton instance may include multiple components. While some of these components may remain unchanged across the preceding build and the current build, other components may change across the preceding build and the current build. By way of an example, changed components may be one or more components that may have been added or removed in the current build when compared to the preceding build. By way of another example, changed components may be one or more components that may have been retained across the preceding build and the current build, but content of these one or more components may have been modified. Therefore, the set of unchanged components may be the components that are common to both the preceding build and the current build, while changed components may be uncommon across the preceding build and the current build As it will be appreciated, multiple test cases may be executed on each build of the singleton instance. In a scenario, multiple test cases may currently be executed on the preceding build. In other words, multiple test cases may be executed on the one or more components of the preceding build. Similarly, multiple tests may be executed on the current build after being deployed, i.e. multiple test cases may be executed on the one or more components of the current build. Since some components may remain common to both the preceding build and the current build, some tests that have already been executed on some components of the preceding build may end up being executed again on the same components in the current build. This may lead to redundancy and, therefore, wastage of time and effort.

To this end, the test case identification module 206 may identify a first set of test cases from a plurality of test cases that have been executed on at least one unchanged (common) component from the set of unchanged components in the preceding build. The execution module 208 may perform execution of the first set of test cases. Based on the identification of the first set of test cases, in some embodiments, the execution module 208 may skip execution of the first set of test cases on the current build. In an embodiment, the execution module 208 may only skip execution of the first set of test cases on the at least one unchanged component in the current build. Further, in some embodiments, the execution module 208 may perform execution of a second set of test cases from the plurality of test cases on a remaining set of unchanged components in the current build. The remaining set of unchanged components may be obtained after removal of the at least one unchanged component from the set of unchanged components. Also, the plurality of test cases may include the first set of test cases and the second set of test cases, and removing the first set of test cases from the plurality of test cases results in the second set of test cases. The execution module 208 may further perform execution of each of the plurality of test cases on at least one changed component in the current build. It may be noted that the at least one changed component may be uncommon across the preceding build and the current build.

The reporting module 210 may be configured to report test results. By way of an example, the reporting module 210 may report test results of executing the first set of test cases on the at least one unchanged component in the preceding build. Further, the reporting module 210 may report test results of executing the second set of test cases on the remaining set of unchanged components in the current build. Furthermore, the reporting module 210 may report test results of executing the plurality of test cases on the at least one changed component in the current build.

Figure 3A:
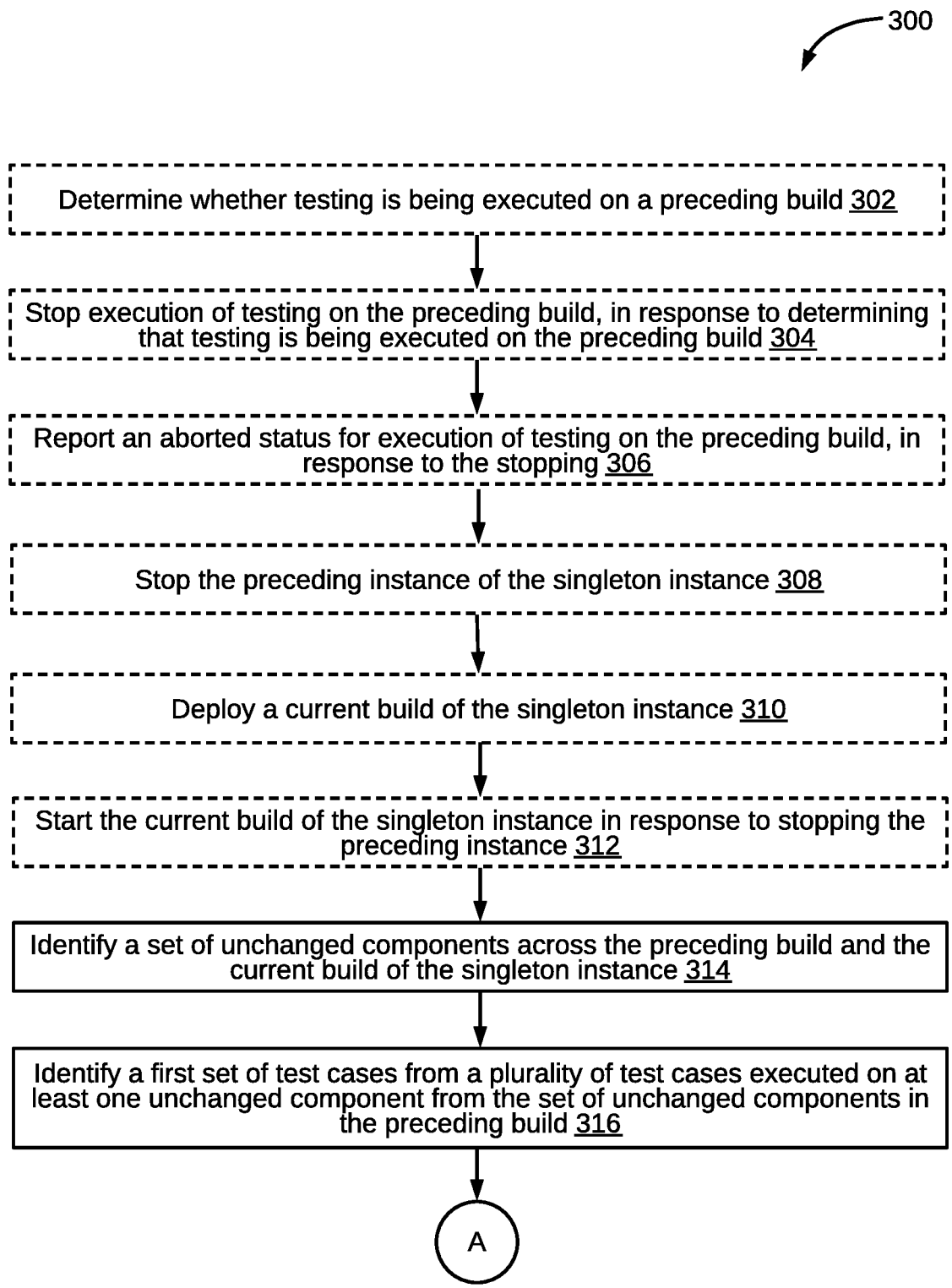
FIGS. 3A and 3B are a flowchart of a method for coordinating continuous delivery pipeline testing against a singleton instance of an application, in accordance with an embodiment.
Figure 3B:
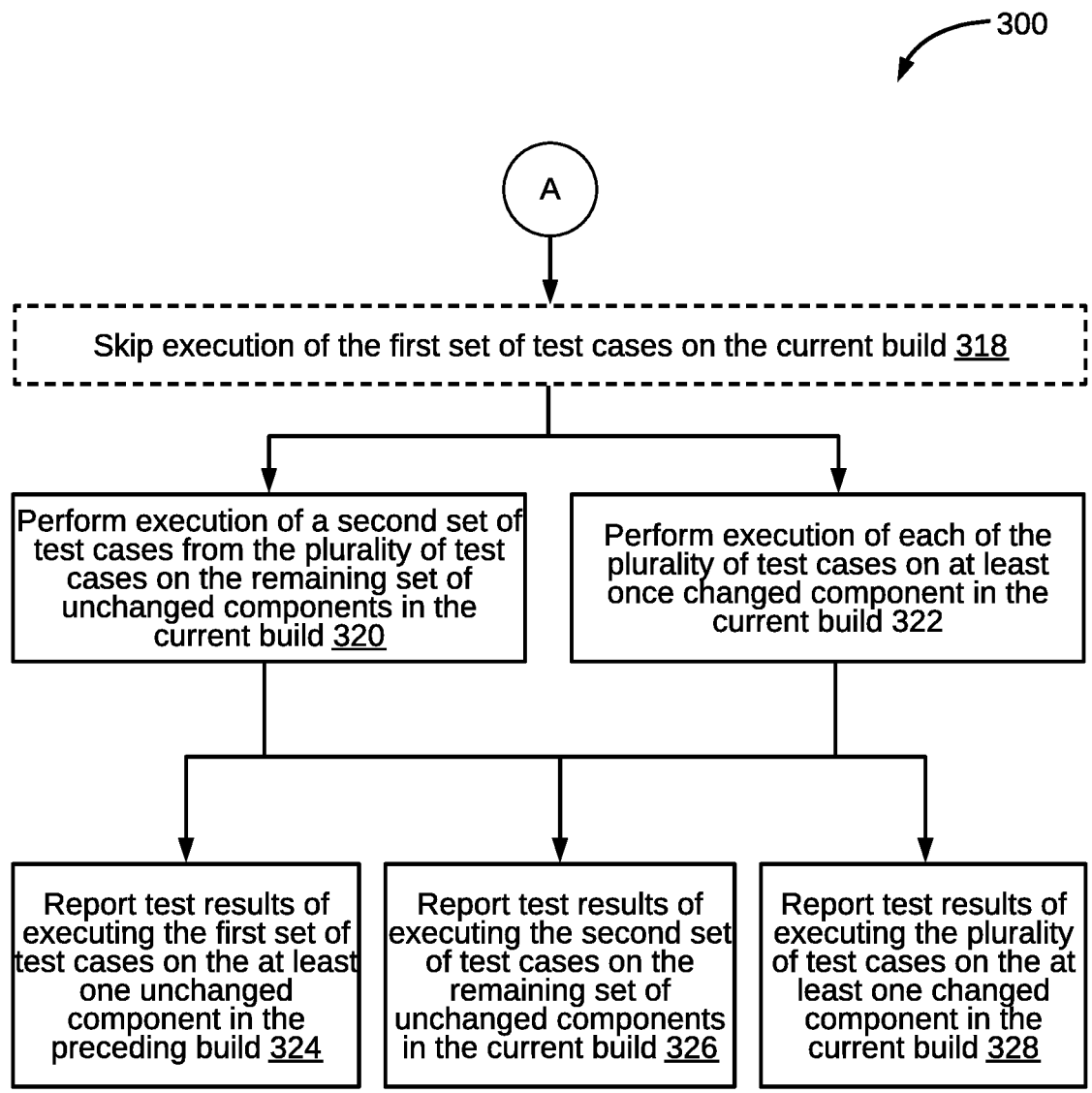

Referring now to FIGS. 3A and 3B, a flowchart of a method 300 for coordinating continuous delivery pipeline testing against a singleton instance of an application is illustrated, in accordance with an embodiment. In some embodiments, the method 300 may be performed by the testing device 202.

In some embodiments, at step 302, it may be determined whether testing is being executed on a preceding build. In response to determining that testing is being executed on the preceding build, at step 304, execution of testing on the preceding build may be stopped. At step 306, an aborted status for execution of testing on the preceding build may be reported, in response to the stopping at step 304. At step 308 the preceding instance of the singleton instance may be stopped. At step 310, the current build of the singleton instance may be deployed. At step 312, the current build of the singleton instance may be started in response to stopping the preceding instance at step 308.

In some embodiments, at step 314, a set of unchanged components across a preceding build and a current build of the singleton instance may be identified. It may be understood that the preceding build precedes the current build. At step 316, a first set of test cases may be identified from a plurality of test cases executed on at least one unchanged component from the set of unchanged components in the preceding build. Additionally, at step 318, execution of the first set of test cases on the current build may be skipped. It may be noted that removing the first set of test cases from the plurality of test cases results in a second set of test cases. In other words, the plurality of test cases may include the first set of test cases and the second set of test cases.

At step 320, execution of a second set of test cases from the plurality of test cases may be performed on a remaining set of unchanged components in the current build. The remaining set of unchanged components may be obtained after removal of the at least one unchanged component from the set of unchanged components. Simultaneously, at step 322, execution of each of the plurality of test cases may be performed on at least one changed component in the current build.

At step 324-328, test results of executing test cases may be reported. By way of an example, at step 324, test results of executing the first set of test cases on the at least one unchanged component in the preceding build may be reported. Simultaneously or sequentially, at step 326, test results of executing the second set of test cases on the remaining set of unchanged components in the current build may be reported. Further, simultaneously or sequentially, at step 328, test results of executing the plurality of test cases on the at least one changed component in the current build may be reported.

Figure 4:
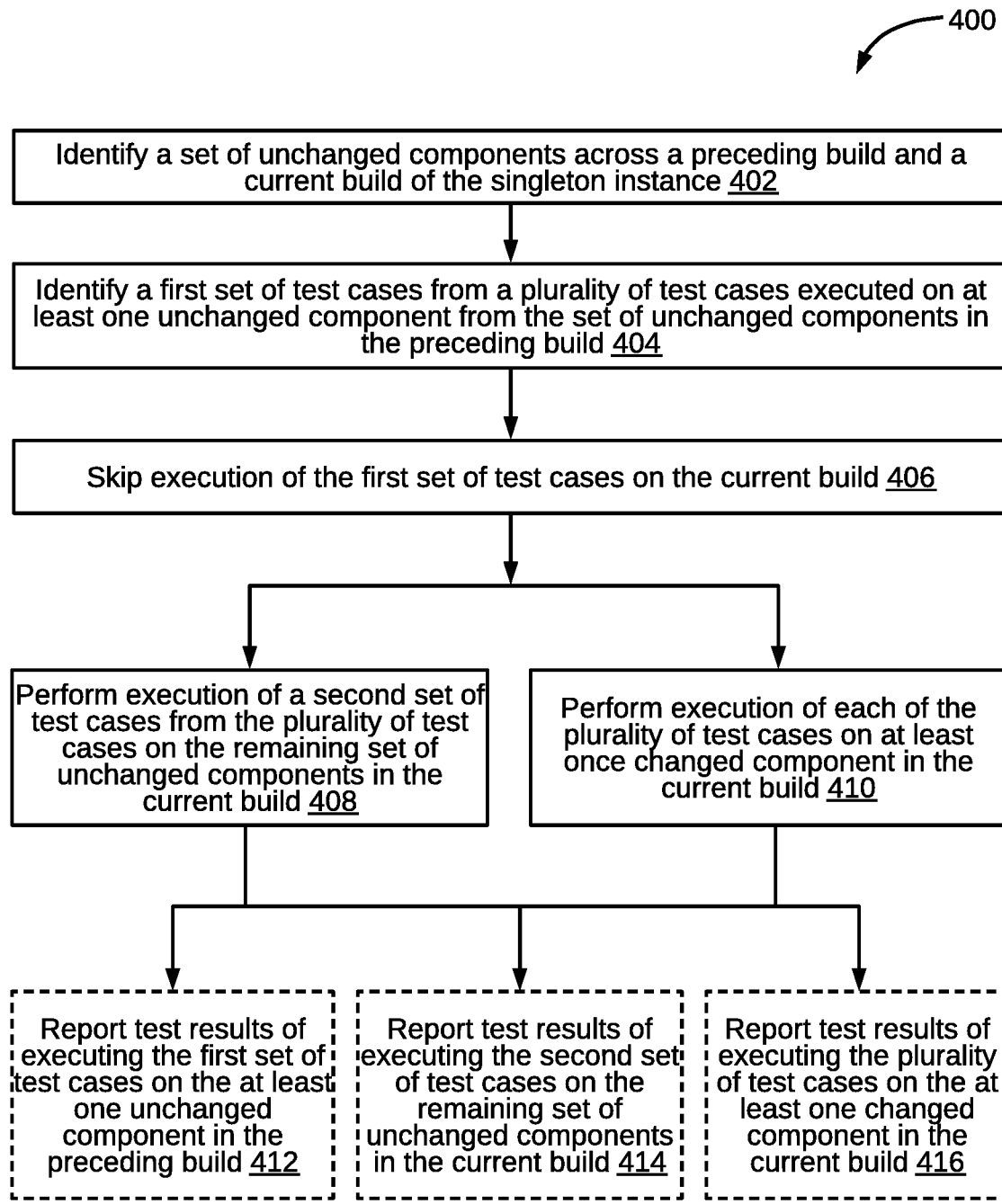
FIG. 4 is a flowchart of a method for coordinating continuous delivery pipeline testing against a singleton instance of an application, in accordance with another embodiment.

Referring now to FIG. 4, a flowchart of a method 400 for coordinating continuous delivery pipeline testing against a singleton instance of an application is illustrated, in accordance with another embodiment. In some embodiments, the method 400 may be performed using the testing device 202.

At step 402, a set of unchanged components across a preceding build and a current build of the singleton instance may be identified. It may be understood that the preceding build precedes the current build. At step 404, a first set of test cases may be identified from a plurality of test cases executed on at least one unchanged component from the set of unchanged components in the preceding build. At step 406, execution of the first set of test cases on the current build may be skipped.

At step 408, execution of a second set of test cases from the plurality of test cases may be performed on a remaining set of unchanged components in the current build. The remaining set of unchanged components may be obtained after removal of the at least one unchanged component from the set of unchanged components. Simultaneously, at step 410, execution of each of the plurality of test cases may be performed on at least one changed component in the current build. It may be noted that the at least one changed component may be uncommon across the preceding build and the current build.

In some embodiments, additionally, at steps 412-416, test results of executing test cases may be reported. By way of an example, at step 412, test results of executing the first set of test cases on the at least one unchanged component in the preceding build may be reported. Simultaneously or sequentially, at step 414, test results of executing the second set of test cases on the remaining set of unchanged components in the current build may be reported. Further, simultaneously or sequentially, at step 416, test results of executing the plurality of test cases on the at least one changed component in the current build may be reported.

Figure 5:
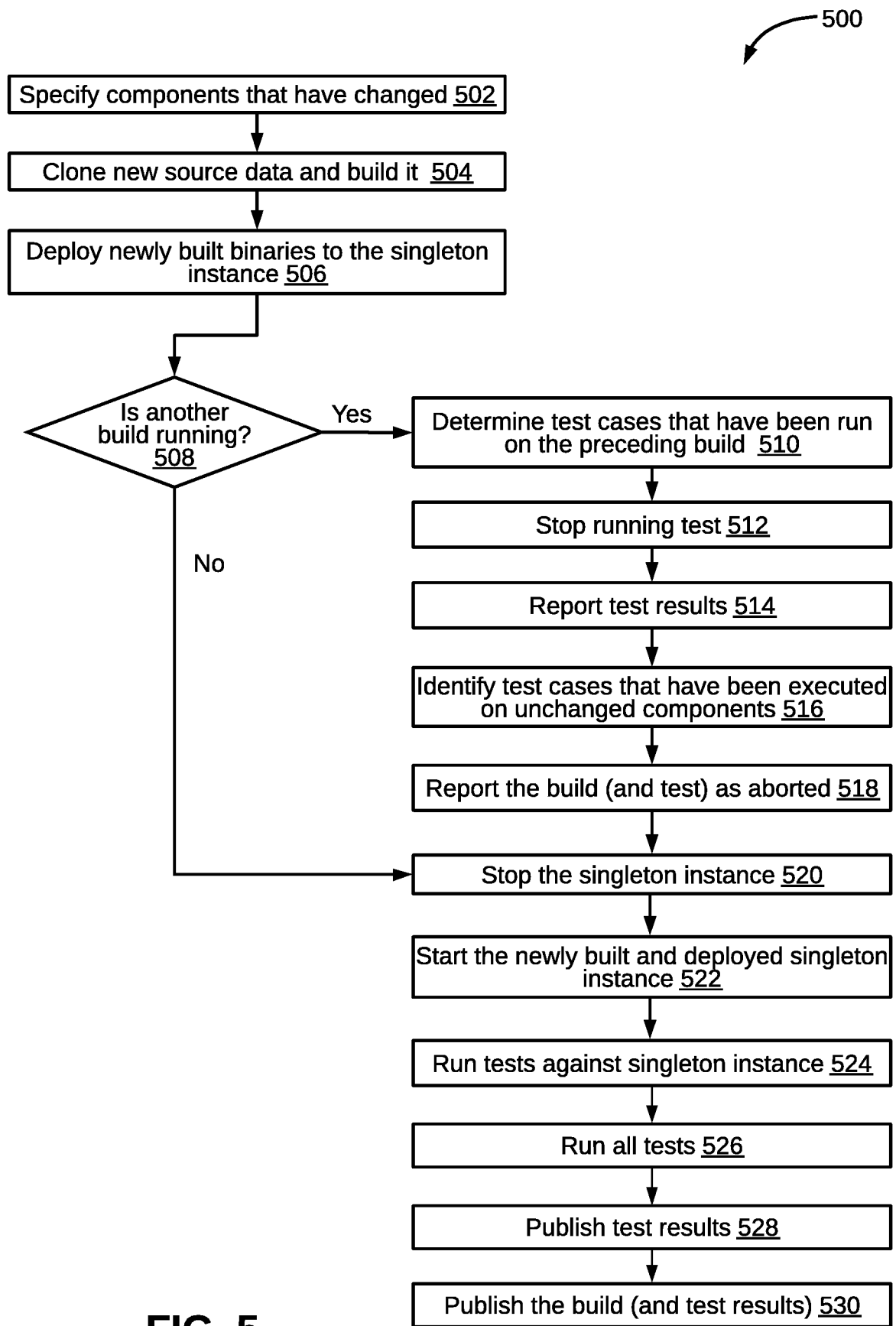
FIG. 5 is a flowchart of a method for coordinating continuous delivery pipeline testing against a singleton instance of an application, in accordance with yet another embodiment.

Referring now to FIG. 5, a flowchart of a method 500 for coordinating continuous delivery pipeline testing against a singleton instance of an application is illustrated, in accordance with yet another embodiment. In some embodiments, the method 500 may be performed by the testing device 202.

At step 502, components that may have changed in a current build of the singleton instance when compared to a preceding build of the singleton instance may be specified. Further, at step 502, a build may be triggered. At step 504, a new source code may be fetched (cloned) and built. At step 506, newly built binaries may be deployed to the singleton instance. At step 508, a check may be performed to determine if another build is already running. If it is determined that another build is already running, the method 500 may proceed to step 510 ("Yes" path). Accordingly, at step 510, test cases that may have already run in the old (preceding) build may be determined. At step 512, the old singleton instance of the test server may be instructed to stop running test. At step 514, upon stopping of the test, the stopping (aborting) of the test may be reported. At step 516, test cases that may have already been run against an unchanged component may be identified. At step 518, the new singleton instance of the test server may be instructed not to run the identified tests (i.e. skip the identified tests). At step 520, the singleton instance may be stopped. At step 522, the new singleton instance may be deployed and started. At step 524, a test system may be instructed to run all or a subset of tests against the new singleton instance. At step 526, the test system may run its tests. In other words, all the tests may be executed. At step 528, the test results may be published. At step 530, the build may be published along with test results.

However, if at step 508, it is determined that another build is already not running, the method 500 may proceed to step 520 ("No" path). Accordingly, at step 520, the singleton instance may be stopped. Further, the steps 522-530 may be repeated as explained above.

As will be appreciated by those skilled in the art, the above techniques relate to coordinating continuous delivery pipeline testing against a singleton instance of an application. The techniques include identifying a set of unchanged components across a preceding build and a current build of the singleton instance, and identifying a first set of test cases executed on at least one unchanged component from the set of unchanged components in the preceding build. The techniques further include performing execution of a second set of test cases from the plurality of test cases on the remaining set of unchanged components in the current build, and performing execution of each of the plurality of test cases on at least one changed component in the current build. The techniques further include reporting test results of executing the first set of test cases on the at least one unchanged component in the preceding build, reporting test results of executing the second set of test cases on the remaining set of unchanged components in the current build, and reporting test results of executing the plurality of test cases on the at least one changed component in the current build.

As such, the above techniques provide for deploying and then testing again the singleton instance. This allows code in one project to be tested together with other components and services which may be managed in other projects. Further, the techniques provide for running multiple tests at the same exact time. Further, the techniques provide for reusing tests as per feasibility. Furthermore, the techniques provide for splitting the tests using timing data, thereby ensuring the tests are split in the most even way, and leading to a shorter overall test time.

The specification has described method and system for coordinating continuous delivery pipeline testing against a singleton instance of an application. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for coordinating continuous delivery pipeline testing against a singleton instance of an application, the method comprising:
   determining whether the testing is being executed on a preceding build;
   stopping execution of the testing on the preceding build, in response to determining the testing is being executed on the preceding build;
   stopping a preceding build of the singleton instance;
   deploying the current build of the singleton instance;
   starting the current build of the singleton instance in response to stopping the preceding build;
   identifying, by a testing device, a set of unchanged components across the preceding build and the current build of the singleton instance, wherein the preceding build precedes the current build;
   identifying, by the testing device, a first set of test cases from a plurality of test cases executed on at least one unchanged component from the set of unchanged components in the preceding build, wherein the first set of test cases are identified after stopping execution of the testing;
   performing, by the testing device, execution of:
      a second set of test cases from the plurality of test cases on remaining set of unchanged components in the current build; and
      each of the plurality of test cases on at least one changed component in the current build, wherein the at least one changed component is uncommon across the preceding build and the current build; and
      wherein performing execution of the second set of test cases and the plurality of test cases on the current build is performed after starting the current build of the singleton instance; and
   reporting, by the testing device, test results of executing;
      the first set of test cases on the at least one unchanged component in the preceding build;
      the second set of test cases on the remaining set of unchanged components in the current build; and
      the plurality of test cases on the at least one changed component in the current build.

2. The method of claim 1, further comprising reporting an aborted status for execution of the testing on the preceding build, in response to the stopping.

3. The method of claim 1, further comprising skipping execution of the first set of test cases on the current build, wherein removing the first set of test cases from the plurality of test cases results in the second set of test cases.

4. A testing device for coordinating continuous delivery pipeline testing against a singleton instance of an application, the testing device comprising:
   a processor; and
   a memory communicatively coupled to the processor, wherein the memory stores processor instructions, which when executed by the processor, cause the processor to:
      determine whether the testing is being executed on a preceding build;
      stop execution of the testing on the preceding build, in response to determining that the testing is being executed on the preceding build;
      stop the preceding build of the singleton instance;
      deploy a current build of the singleton instance;
      start the current build of the singleton instance in response to stopping the preceding build;
      identify a set of unchanged components across the preceding build and the current build of the singleton instance, wherein the preceding build precedes the current build;
      identify a first set of test cases from a plurality of test cases executed on at least one unchanged component from the set of unchanged components in the preceding build, wherein the first set of test cases are identified after stopping execution of the testing;
      perform execution of:
         a second set of test cases from the plurality of test cases on remaining set of unchanged components in the current build; and
         each of the plurality of test cases on at least one changed component in the current build, wherein the at least one changed component is uncommon across the preceding build and the current build; and
         wherein performing execution of the second set of test cases and the plurality of test cases on the current build is performed after starting the current build of the singleton instance; and
      report test results of executing;
         the first set of test cases on the at least one unchanged component in the preceding build;
         the second set of test cases on the remaining set of unchanged components in the current build; and
         the plurality of test cases on the at least one changed component in the current build.

5. The testing device of claim 4, wherein the processor instructions further cause the processor to report an aborted status for execution of the testing on the preceding build, in response to the stopping.

6. The testing device of claim 4, wherein the processor instructions further cause the processor to skip execution of the first set of test cases on the current build, wherein removing the first set of test cases from the plurality of test cases results in the second set of test cases.

7. The testing device of claim 4, wherein the testing device is a test server.

8. A non-transitory computer-readable medium storing computer-executable instructions for coordinating continuous delivery pipeline testing against a singleton instance of an application, the computer-executable instructions configured for:
   determining whether the testing is being executed on a preceding build;
   stopping execution of the testing on the preceding build, in response to determining that the testing is being executed on the preceding build;
   stopping the preceding build of the singleton instance;
   deploying a current build of the singleton instance;
   starting the current build of the singleton instance in response to stopping the preceding build:
   identifying, by a testing device, a set of unchanged components across the preceding build and the current build of the singleton instance, wherein the preceding build precedes the current build;
   identifying, by the testing device, a first set of test cases from a plurality of test cases executed on at least one unchanged component from the set of unchanged components in the preceding build, wherein the first set of test cases are identified after stopping execution of the testing;

performing, by the testing device, execution of:
  a second set of test cases from the plurality of test cases on remaining set of unchanged components in the current build; and
  each of the plurality of test cases on at least one changed component in the current build, wherein the at least one changed component is uncommon across the preceding build and the current build; and
  wherein performing execution of the second set of test cases and the plurality of test cases on the current build is performed after starting the current build of the singleton instance; and
reporting, by the testing device, test results of executing: the first set of test cases on the at least one unchanged component in the preceding build;
  the second set of test cases on the remaining set of unchanged components in the current build; and
  the plurality of test cases on the at least one changed component in the current build.

9. The non-transitory computer-readable medium of claim 8, wherein the computer-executable instructions are further configured for reporting an aborted status for execution of the testing on the preceding build, in response to the stopping.

10. The non-transitory computer-readable medium of claim 8, wherein the computer-executable instructions are further configured for skipping execution of the first set of test cases on the current build, wherein removing the first set of test cases from the plurality of test cases results in the second set of test cases.

\* \* \* \* \*